(12) United States Patent
Isano

(10) Patent No.: US 7,428,101 B2
(45) Date of Patent: Sep. 23, 2008

(54) OPTICAL RETARDATION PLATE AND METHOD OF MANUFACTURING THE SAME

(75) Inventor: Taisuke Isano, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 11/064,602

(22) Filed: Feb. 24, 2005

(65) Prior Publication Data

US 2005/0191467 A1    Sep. 1, 2005

(30) Foreign Application Priority Data

Feb. 27, 2004    (JP)    ............... 2004-053252

(51) Int. Cl.
*G02B 5/18*    (2006.01)
*G02B 27/00*    (2006.01)

(52) U.S. Cl. ..................... 359/576; 359/596

(58) Field of Classification Search .......... 359/96, 359/569, 576
See application file for complete search history.

(56) References Cited

U.S. PATENT DOCUMENTS

| 5,696,584 | A  | * | 12/1997 | Franz et al. | ................ | 356/521 |
| 6,930,326 | B2 | * | 8/2005  | Kato et al.  | ................ | 257/59  |
| 6,947,215 | B2 | * | 9/2005  | Hoshi        | ................ | 359/576 |
| 2002/0089750 | A1 | * | 7/2002 | Hoshi     | ................ | 359/566 |

FOREIGN PATENT DOCUMENTS

JP    7-099402    4/1995

OTHER PUBLICATIONS

D.C. Flanders, Applied Physics Letters, vol. 42, No. 6 (Mar. 15, 1983), pp. 492 to 494.
Wenyong, Deng et al; "Fabrication and Properties of Visible-Light Sub-Wavelength Amorphous Silicon Transmission Gratings"; Journal of Vacuum Science and Technology; Part B. vol. 13, No. 6, Nov./Dec. 1995 (Nov. 1, 1995), New York, NY, pp. 2879-2882.
Kim, D. J. et al; "Influence of calcination temperature on structural and optical properties of TiO2 thin fims prepared by sol-gel dip coating"; Materials Letters, vol. 57, No. 2, Dec. 2002, pp. 355-360.
Flanders, D.C.; "Submicrometer Periodicity Gratings as Artificial Anisotropic Dielectrics", Applied Physics Letters, vol. 42, No. 6, 1983, pp. 492-494.
European Search Report dated Apr. 28, 2005.

* cited by examiner

*Primary Examiner*—Duy-Vu N Deo
(74) *Attorney, Agent, or Firm*—Morgan & Finnegan, LLP

(57) ABSTRACT

A dielectric substrate having a refractive index $n_1$ is covered with an amorphous dielectric medium having a refractive index $n_2$ larger than the refractive index $n_1$, and a rectangular grating is formed in the amorphous dielectric medium through an etching process. When microcrystal is formed in the amorphous dielectric medium through a thermal treatment to increase the refractive index $n_2$, a magnitude $\Delta n$ of structure double refraction increases accordingly. Hence, a phase refraction $\Delta\Phi$ of an irregular grating pattern in the rectangular grating becomes large without increasing a depth D of each trench of the rectangular grating, and thus it is possible to obtain an optical retardation plate having a fine periodic structure and having a desired plate retardation.

1 Claim, 7 Drawing Sheets

CRYSTALLIZED AREA

AMORPHOUS AREA

CRYSTALLIZED AREA

AMORPHOUS AREA

CRYSTAL GRAIN

OPTICAL RETARDATION PLATE AND METHOD OF MANUFACTURING THE SAME

BACKGROUND OF THE INVENTION

1. Field of the Invention

The present invention relates to an optical retardation plate using a dielectric medium, and a method of manufacturing the same.

2. Related Background Art

Heretofore, an optical retardation plate is manufactured by polishing a crystalline plate made of a quartz crystal. In this case, a thickness of the optical retardation plate is adjusted so that a phase retardation between ordinary light and extraordinary light becomes an (N+¼) wavelength (N: integral number) in a ¼ retardation plate, an (N+½) wavelength in a ½ retardation plate, and an N wavelength in a full retardation plate.

In addition to such a method utilizing the crystal polishing, a method using a grating utilizing structure double refraction based on a structure of dielectric is also proposed. Proposal and experiments on a retardation plate using this grating is described in an article written by D. C. Flanders: Applied Physics Letters, Vol. 42, No. 6 (Mar. 15, 1983), pp. 492 to 494.

The optical retardation plate using a grating utilizes a fact that a refractive index na in a direction parallel to an extension direction of trenches of the grating and a refractive index nb in a direction intersecting perpendicularly the extension direction of the trenches of the grading are different from each other in an area where a wavelength λ is sufficiently smaller than a pitch d. According to the above article, when the grating has a rectangular shape, the refractive index na and the refractive index nb are given by Equations (1) and (2), respectively:

$$na = \{n_1^2 + n_2^2(1-q)\}^{1/2} \quad (1)$$

$$nb = \{(1/n_1)^2 q + (1/n_2)^2 (1-q)\}^{-1/2} \quad (2)$$

where $n_1$ is a refractive index of a first medium, $n_2$ is a refractive index of a second medium, and q is a ratio which the first medium occupies for one period of the grating and which is in a range of $0 \leq q \leq 1$. Then, a magnitude Δn of double refraction is given by Equation (3):

$$\Delta n = |na - nb| \quad (3)$$

In addition, when a depth of each trench in the grating is assigned D, a phase retardation ΔΦ which light made incident to the grating having the double refraction with the magnitude Δn undergoes is given by Equation (4):

$$\Delta\Phi[rad] = (2\pi D/\lambda)\Delta n \quad (4)$$

It is understood from Equation (4) that in order to obtain a large phase retardation ΔΦ, the depth D of each trench has to be increased or the magnitude Δn of the double refraction has to be increased. This relationship is established not only when the grating shape is rectangular, but also when the grating shape is a sine wave-like shape, a chopping wave-like shape, or the like.

In order to concretely manufacture a retardation plate using the grating based on the above-mentioned principles, the following two methods are mainly, readily considered. A first method is a method in which a grating is formed in a photoresist film by utilizing an interference exposure method, a mold is manufactured from the resultant grating, and the grating is transferred to a thermoplastic resin through the mold by utilizing a hot press method or an injection molding method, or is transferred to a photocuring resin.

A second method is a method in which a grating made of a photoresist film is formed on a dielectric substrate similarly to the first method, and the dielectric substrate is selectively etched away by utilizing an ion etching method or a reactive ion etching method using the photoresist film as an etching mask to obtain a grating on a surface of the dielectric substrate.

When such a grating is manufactured by utilizing the first method, since a substantial contact surface area between a medium and an electroformed mold remarkably increases, a tensile shear force when the medium is peeled from a mold surface becomes large. For this reason, there is encountered a problem that the cured medium is peeled off from a substrate during the peeling to be left on the mold surface, and hence the transfer of the grating becomes difficult.

In addition, in the case of the second method, since a time required for the etching extends over several hours and hence the photoresist mask able to withstand the etching is necessarily thickened, the formation of the photoresist mask is difficult.

In addition, in a case as well where a grating formed on a photoresist film is transferred to a material having high etching resistances e.g., a chromium (Cr) film, and an etching is carried out using the chromium film as an etching mask, progress of the etching is blocked since along with an increase in depth of each trench of the grating, a dielectric medium which is etched once is restucked to a surface of a substrate, and the number of particles such as active radicals, ions or neutral particles which arrive at bottom portions of trenches decreases. Thus, it is difficult to form a grating having a desired shape. Such a problem arises irrespective of a shape of a grating. Also, when a size of a substrate is large, uniformity within a surface during the etching becomes poor, and hence an excellent manufacture yield cannot be obtained.

JP 7-99402 B discloses that a grating is covered with a dielectric medium having a sufficiently large refractive index to make a depth of each trench small in order to cope with those problems. In case of this method as well, however, the dielectric medium is difficult to be formed to a bottom portion of each trench since a width of each trench is small.

FIG. 13 shows a conventional manufacture example in a general film formation state in which no film management is carried out, i.e., FIG. 13 shows a cross section image, observed with a scanning electron microscope (SEM), of a formed film which is obtained by mixedly forming an amorphous film and a crystallized film each made of titanium dioxide ($TiO_2$) on a quartz wafer. In this cross section image, an upper portion having a columnar structure is a crystallized area and a lower portion is an amorphous area.

FIG. 14 shows a cross section image, observed with a SEM, of a grating which is formed by selectively etching away the dielectric medium. It is generally known that a crystallized area and an amorphous area are different in etching rate, and the etching rate of the amorphous area is higher than that of the crystallized area. From this fact, the cross section image of FIG. 14 shows that since side etch for a lower area especially progresses, this lower area is the amorphous area.

When crystallized particles mixedly exist in an amorphous dielectric medium, since the etching rate of portions of the crystallized particles is low, the portions of the crystalline particles are left as shown in FIG. 15 without being etched away. In addition, the crystallized particles function as an etching mask during the etching and hence portions under the crystallized particles are not etched away. Thus, an optical retardation plate using a grating cannot be satisfactorily manufactured.

The phase retardation ΔΦ which the light made incident to the grating undergoes, as shown in Equation (4), is proportional to the depth D of each trench of the grating and the magnitude Δn of the double refraction. Then, a dielectric medium which is much larger in refractive index than a dielectric substrate is formed on the dielectric substrate to form a grating shape, thereby allowing the depth D of each trench of the grating to be made small. However, when the dielectric medium is crystallized or the crystallized particles exist, the etching rate differs depending on lattice directions of a crystal, or the amorphous area and the crystallized area are different in etching rate. Accordingly, the uniform etching becomes difficult to be carried out.

SUMMARY OF THE INVENTION

The present invention has been made in order to solve the above-mentioned problems, and it is, therefore, an object of the present invention to provide a phase grating type optical retardation plate for which a dielectric medium in an amorphous state is formed on a dielectric substrate, thereby making uniform etching possible, and a method of manufacturing the same.

In order to attain the above-mentioned object, according to one aspect of the present invention, an optical retardation plate is manufactured by utilizing a method including: forming at least one kind of amorphous dielectric medium on a substrate; and etching the at least one kind of amorphous dielectric medium to form an irregular grating pattern having a periodic structure having a period equal to or shorter than a wavelength in use.

In addition, according to another aspect of the present invention, a method of manufacturing an optical retardation plate includes: forming at least one kind of amorphous dielectric medium on a substrate; etching the at least one kind of amorphous dielectric medium to form an irregular grating pattern having a periodic structure with a period equal to or shorter than a wavelength in use; and crystallizing the etched dielectric medium through a thermal treatment to increase a refractive index of the film and to increase a phase retardation in the irregular grating pattern.

According to the optical retardation plate and the method of manufacturing the same of the present invention, the etching processing is executed using the film which is obtained by forming the dielectric medium while the dielectric medium is managed in the amorphous state, whereby a product having a nearly rectangle grating shape and having no etching nonuniformity within the grating can be inexpensively mass-produced in high yields.

In addition, performing the thermal treatment makes it possible to increase the phase retardation in the irregular grating pattern.

DESCRIPTION OF THE PREFERRED EMBODIMENTS

The present invention will hereinafter be described in detail based on Embodiments shown in FIGS. 1 to 12.

First Embodiment

Figure 1:
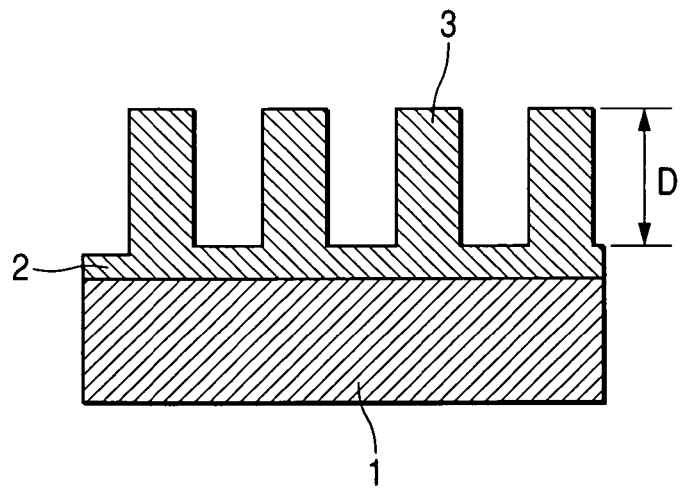
FIG. 1 is a schematic cross sectional view of an optical retardation plate in which a rectangular grating is formed in a dielectric medium according to First Embodiment of the present invention.

FIG. 1 is a cross sectional view showing a state in which a surface of a dielectric substrate 1 having a refractive index $n_1$ is coated with an amorphous dielectric medium 2 having a refractive index $n_2$ larger than the refractive index $n_1$, and the amorphous dielectric medium 2 is selectively etched away to form a rectangular grating 3. Then, when the refractive index $n_2$ of the amorphous dielectric medium 2 increases through a thermal treatment, a magnitude Δn of structure double refraction increases accordingly. Thus, the magnitude Δn of the structure double refraction is made large without making a depth D of each trench of the rectangular grating 3 large in accordance with Equation (4), thereby increasing a phase retardation ΔΦ.

Figure 2:
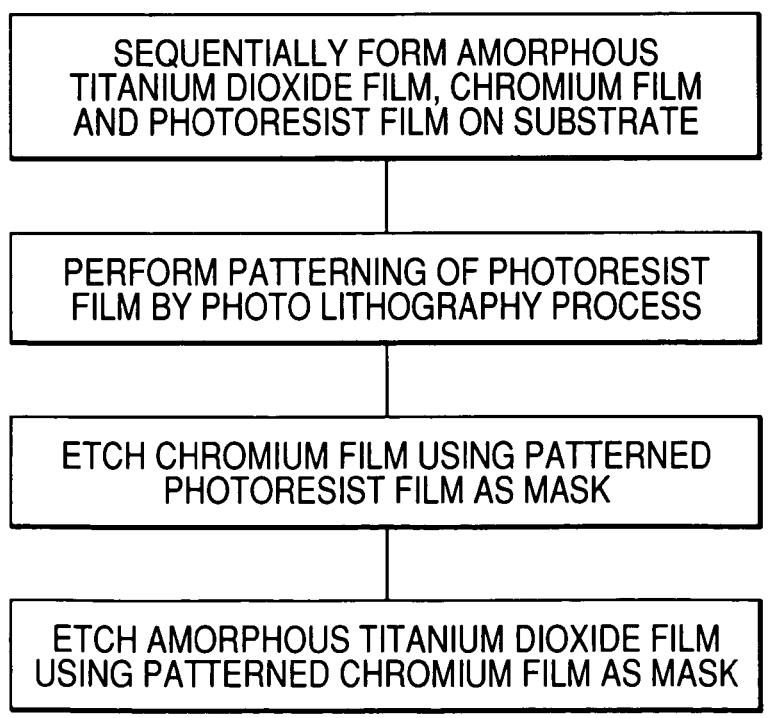
FIG. 2 is a process flow chart in First Embodiment of the present invention.

FIG. 2 is a process flow chart in Embodiment 1 of the present invention. The amorphous dielectric medium 2 made of titanium dioxide ($TiO_2$) in an amorphous state is formed on the surface of the dielectric substrate 1 made of a quartz wafer, and a chromium film and a photoresist film are sequentially formed on the amorphous dielectric medium 2. The photoresist film is patterned through a photolithography process. Thereafter, the chromium film is selectively etched away using the patterned photoresist film as an etching mask, and the amorphous dielectric medium 2 is selectively etched away using the patterned chromium film as an etching mask, thereby forming the rectangular grating 3 having a periodic structure with a period shorter than a wavelength of visible light, e.g., 260 nm.

Note that at least one of niobium (Nb) and silicon (Si) may be added to the titanium dioxide film as the amorphous dielectric medium 2 to adjust the refractive index $n_2$ of the amorphous dielectric medium 2.

Figure 3:
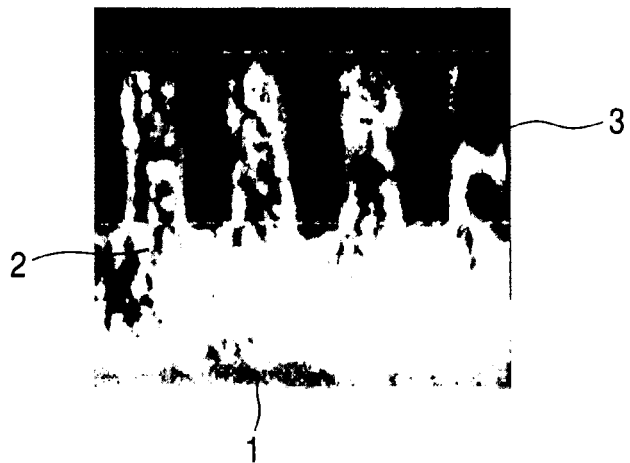
FIG. 3 is a cross section image observed with a SEM in First Embodiment of the present invention.

FIG. 3 is a cross section image, observed with a SEM, of the rectangular grating 3. It can be seen from FIG. 3 that the amorphous dielectric medium 2 and the rectangular grating 3 are formed on the dielectric substrate 1, and the optical retardation plate using an irregular grating pattern having the rectangular grating 3 is ideally manufactured.

Second Embodiment

Figure 4:
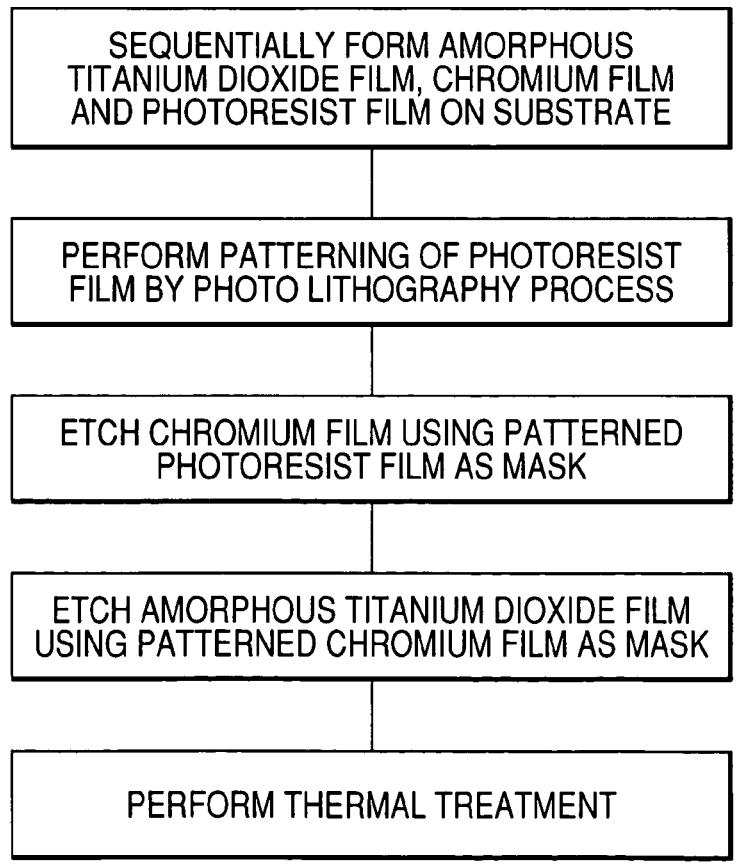
FIG. 4 is a process flow chart in Second Embodiment of the present invention.

FIG. 4 is a process flow chart in Second Embodiment. In Second Embodiment, a thermal treatment is further carried out for the optical retardation plate manufactured in accordance with the method described in First Embodiment at 700° C. or 800° C. for one hour to form microcrystal particles in the amorphous dielectric medium 2. Thus, the refractive index $n_2$ of the amorphous medium 2 is increased to increase phase retardation in terms of phase retardation characteristics.

Figure 5:
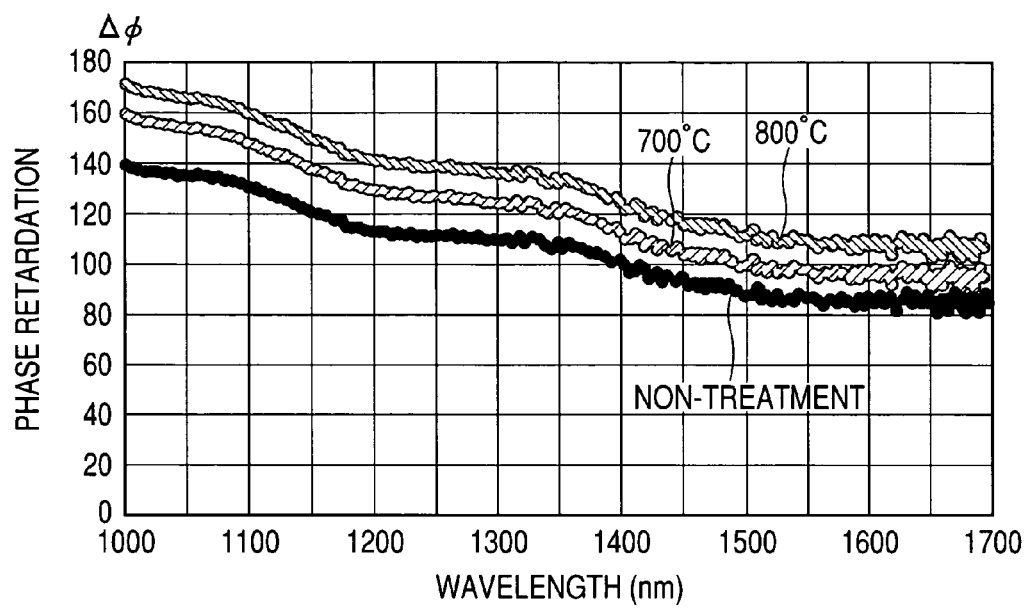
FIG. 5 is a graphical representation showing a relationship between a wavelength and a phase retardation in Second Embodiment of the present invention.

FIG. 5 is a graphical representation in which data on the phase retardations measured after completion of the above-mentioned thermal treatment is plotted against data on wavelengths. The graph shows that the thermal treatment at 700° C. or 800° C. for one hour makes the phase retardation $\Delta\Phi$ in the optical retardation plate of Second Embodiment larger than that in the optical retardation plate of First Embodiment which is manufactured without carrying out the thermal treatment, and as the temperature during the thermal treatment becomes higher, a ratio in amount of the microcrystalline particles to the amorphous dielectric medium 2 further increases, and hence the phase retardation $\Delta\Phi$ becomes larger.

It is also experimentally verified that the additional thermal treatment makes the refractive index $n_2$ of the amorphous dielectric medium 2 large to increase a difference in refractive index between the amorphous dielectric medium 2 and a circumferential medium such as air, thereby increasing the magnitude $\Delta n$ of the double refraction. Therefore, the phase retardation $\Delta\Phi$ in the optical retardation plate of Second Embodiment can be made larger than that in the optical retardation plate manufactured in accordance with the method described in First Embodiment.

Figure 6:
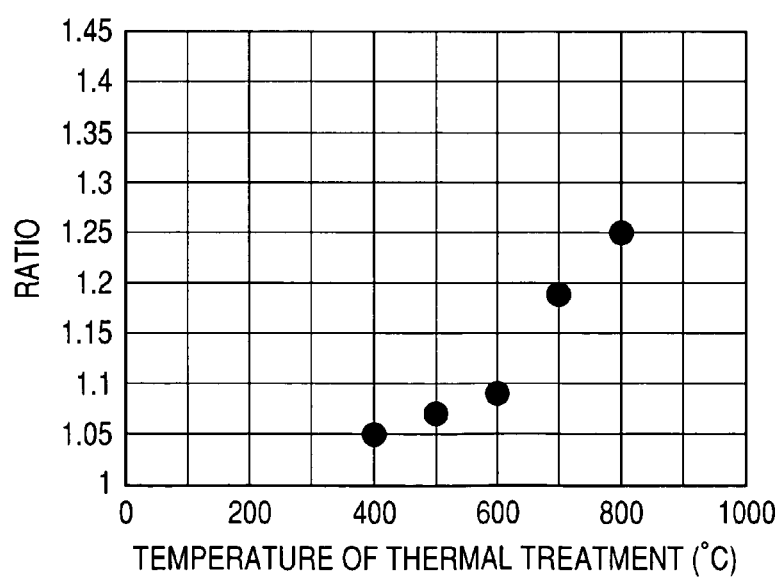
FIG. 6 is a graphical representation showing a relationship between a temperature of a thermal treatment and a ratio in phase retardation in Second Embodiment of the present invention.

FIG. 6 shows a graphical representation which is obtained such that the thermal treatments are carried out for the optical retardation plates each having the amorphous dielectric medium 2 formed under the same conditions at 400° C., 500° C., 600° C., 700° C. and 800° C., respectively, in accordance with the method described in Second Embodiment, and ratios of the phase retardations $\Delta\Phi$ after completion of the respective thermal treatments are plotted against the respective thermal treatment temperatures when the phase retardation $\Delta\Phi$ before any of the thermal treatments is normalized as 1. It is understood from FIG. 6 as well that the phase retardation $\Delta\Phi$ after the thermal treatment further increases as the temperature of the thermal treatment is higher.

The additional thermal treatment is applied to the irregular grating pattern having the rectangular grating 3 in the amorphous dielectric medium 2 in such a manner, whereby the desired phase retardation $\Delta\Phi$ can be obtained even when a depth of each trench of the rectangular grating 3 of the amorphous dielectric medium 2 is made small through the etching process.

Third Embodiment

Figure 7:
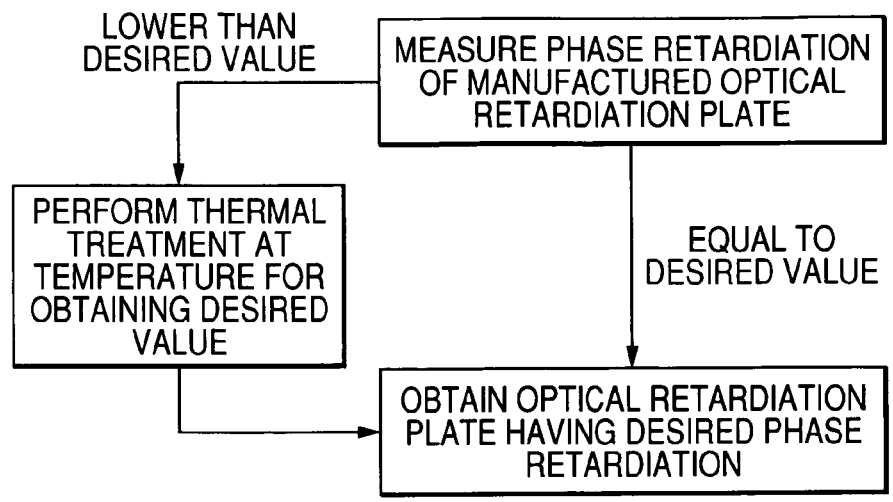
FIG. 7 is a process flow chart in Third Embodiment of the present invention.

FIG. 7 shows a process flow chart in Third Embodiment. When the phase retardation of the optical retardation plate manufactured in accordance with the method described in First Embodiment is smaller than the desired phase retardation $\Delta\Phi$, the thermal treatment is carried out for this optical retardation plate at a temperature permitting the desired phase retardation $\Delta\Phi$ to be obtained, thereby allowing the phase retardation $\Delta\Phi$ to be corrected.

If the phase retardation $\Delta\Phi$ of the optical retardation plate right immediately after its manufacture made in accordance with the method described in First Embodiment is 150° when the desired phase retardation $\Delta\Phi$ of the optical retardation plate is 180° for example, it is necessary to correct a shortage of 30°. When a relationship between the temperature of the thermal treatment and the retardation correction is made clear from the experiments, the thermal treatment corresponding to the correction for the shortage of 30° may be carried out using this relationship.

In Third Embodiment, when it is verified from the experiments that the thermal treatment at 700° C. corresponds to the correction for the shortage of 30°, the thermal treatment at 700° C. is carried out for the optical retardation plate to crystallize the amorphous dielectric medium 2 or generate a large number of microcrystalline particles, thereby correcting the phase retardation $\Delta\Phi$. Thus, finally, it is possible to manufacture the optical retardation plate having the target phase retardation $\Delta\Phi$ of 180° C.

Fourth Embodiment

Figure 8:
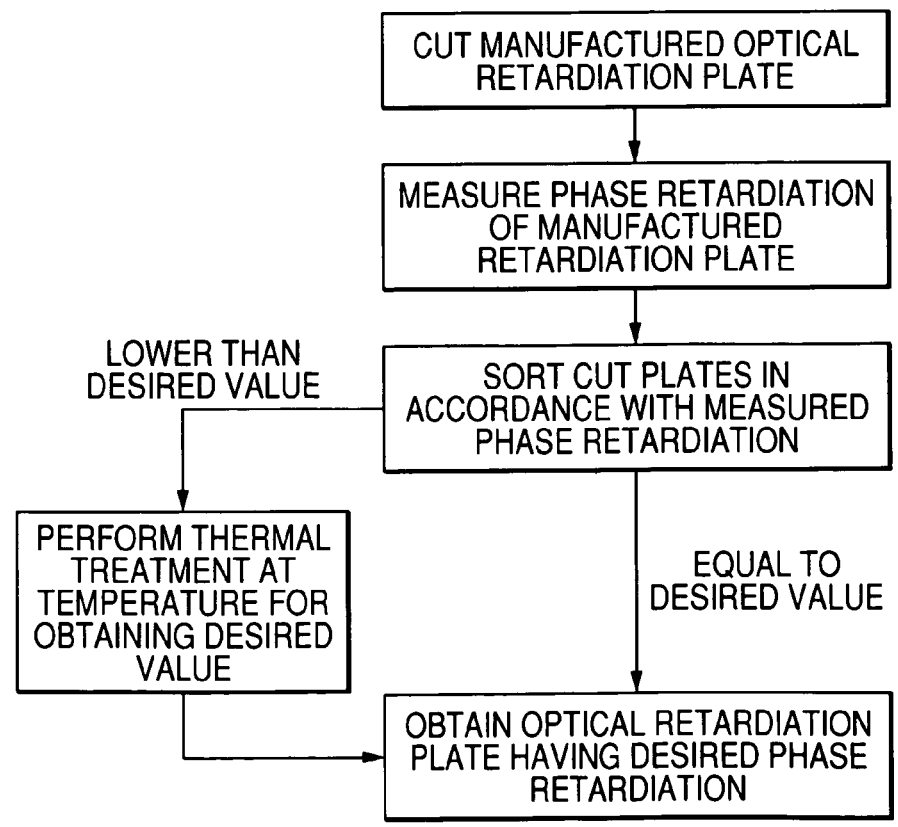
FIG. 8 is a process flow chart in Forth Embodiment of the present invention.

FIG. 8 is a process flow chart in Fourth Embodiment. When the optical retardation plates each having the normal rectangular grating 3 are manufactured, the optical retardation plates are manufactured by collectively, selectively etching away the dielectric substrate 1. However, the depths of the trenches of the rectangular gratings 3 within the surface of the dielectric substrate 1 do not become uniform due to nonuniformity in an internal state of an etching system, and hence the phase retardations $\Delta\Phi$ within the surface of the dielectric substrate 1 may not be uniform in some cases.

Then, when the optical retardation plates manufactured in accordance with the method described in First Embodiment have loose phase retardations $\Delta\Phi$ each being smaller than the target phase retardation $\Delta\Phi$, the dielectric substrate 1 is cut off to separate the optical retardation plates from one another, and the optical retardation plates having near phase retardations $\Delta\Phi$ are then collected. Then, the thermal treatment is carried out for the collected optical retardation plates in accordance with the method described in Embodiment 3, thereby correcting the near phase retardations $\Delta\Phi$.

According to the method described in Fourth Embodiment, since the thermal treatments can be carried out at respective temperatures suitable for the optical retardation plates when the uniformity of the depths of the rectangular gratings 3 within the dielectric substrate 1 is poor, all the irregular grating patterns within the dielectric substrate 1 can be corrected so as for each of them to have the desired plate retardation $\Delta\Phi$.

Fifth Embodiment

When the optical retardation plates each having the normal retardation grating 3 are manufactured, as described above, the plate retardations within the surface of the dielectric substrate 1 are not uniform. Moreover, the optical retardation plates may show a tendency in which the depth of the trench of the rectangular grating 3 is shallow at a central portion of the dielectric substrate 1 while the depth of the trench of the rectangular grating 3 becomes deep in a position located more outward, concentrically within the dielectric substrate 1, or the depth of the trench of the rectangular grating 3 is deep at the central portion of the dielectric substrate 1, while the depth of the trench of the rectangular grating 3 becomes shallow in a position located more outward, concentrically within the dielectric substrate 1 in some cases. In those cases, the phase retardation $\Delta\Phi$ within the surface of the dielectric substrate 1 also change concentrically.

Figure 9:
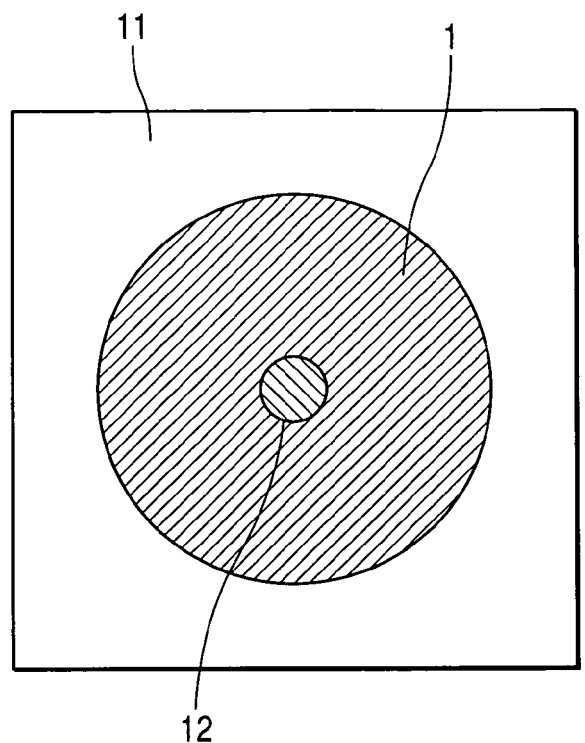
FIG. 9 is a plan view explaining a thermal treatment method in Fifth Embodiment of the present invention.

Then, in Fifth Embodiment, when a position where the phase retardation $\Delta\Phi$ becomes maximum is located in an outer side within the dielectric substrate 1 as shown in FIG. 9, a heat source 12 of a thermal treatment system 11 is installed so as to be located at a center of the dielectric substrate 1, and the thermal treatment is carried out so that a temperature further drops in a position located more outward, concentrically within the dielectric substrate 1.

Figure 10:
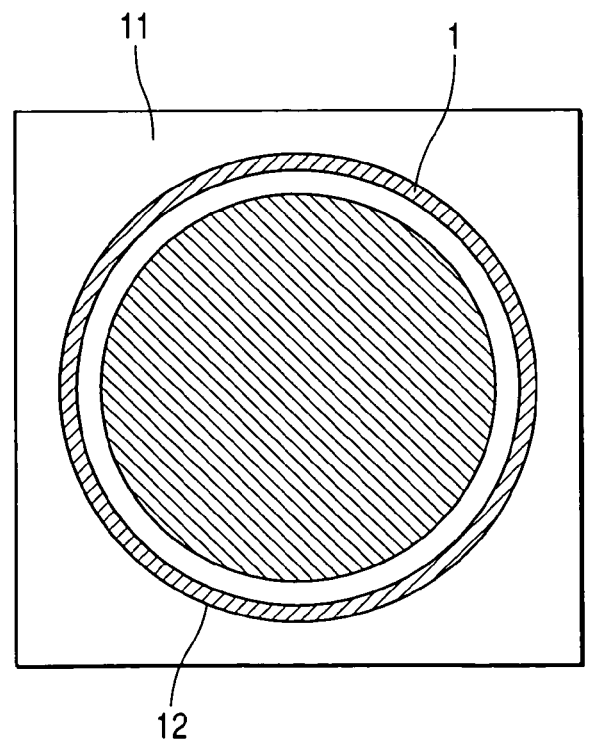
FIG. 10 is a plan view explaining another thermal treatment method in Fifth Embodiment of the present invention.

On the other hand, when the position where the phase retardation $\Delta\Phi$ becomes maximum is located at a center of the dielectric substrate 1, as shown in FIG. 10, the heat source 12 is installed annularly outside the dielectric substrate 1, and a thermal treatment is carried out so that a temperature further drops in a position nearer the center of a concentric circle.

According to Fifth Embodiment, when the depths of the trenches of the rectangular gratings 3 within the dielectric substrate 1 changes concentrically, the thermal treatment having a heat distribution corresponding to the concentric change of the depths is carried out, whereby all the irregular grating patterns within the dielectric substrate 1 can be corrected so as for each of them to have the averaged desired phase retardation $\Delta\Phi$.

Sixth Embodiment

Figure 11:
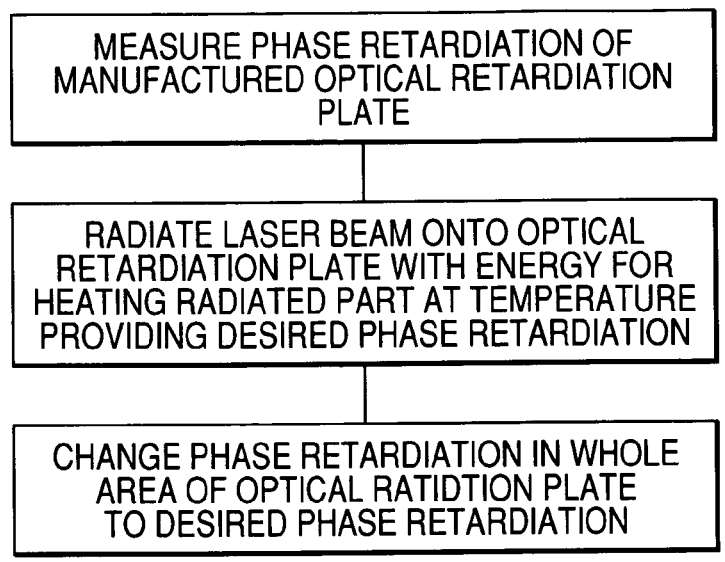
FIG. 11 is a process flow chart in Sixth Embodiment of the present invention.
Figure 12:
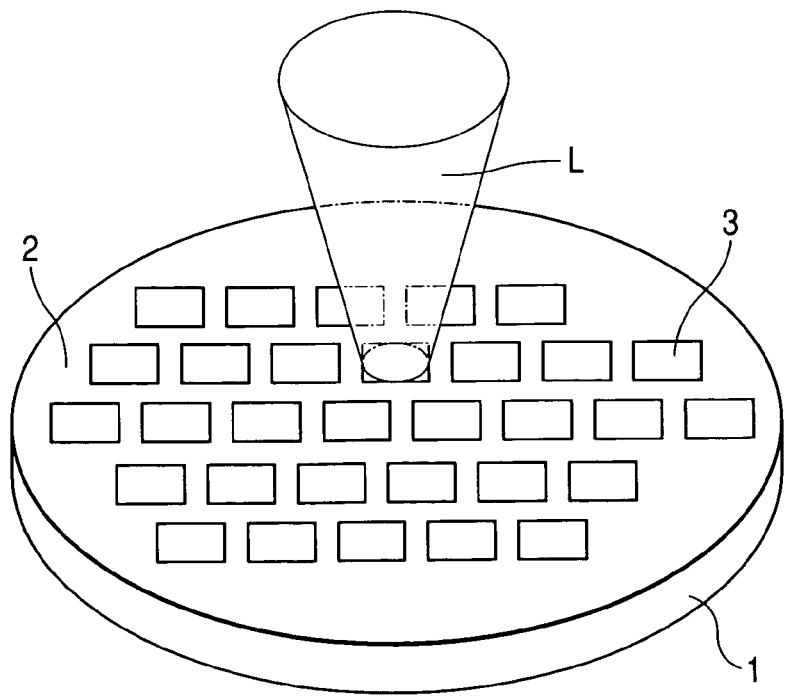
FIG. 12 is a schematic perspective view explaining a thermal treatment method in Sixth Embodiment of the present invention.
Figure 13:
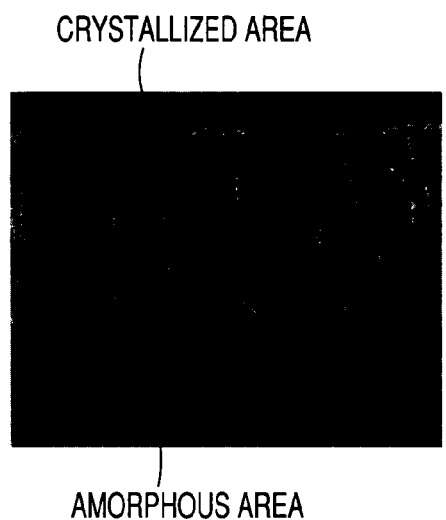
FIG. 13 is a cross section image which is observed with a SEM and in which a crystallized film and an amorphous film mixedly exist.
Figure 14:
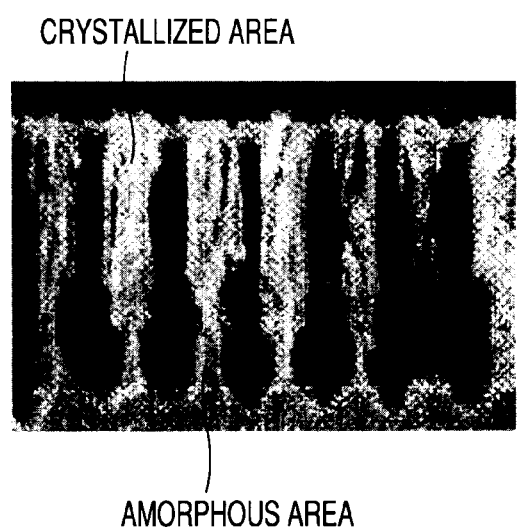
FIG. 14 is a cross section image, observed with a SEM, of a grating formed in a dielectric medium.
Figure 15:
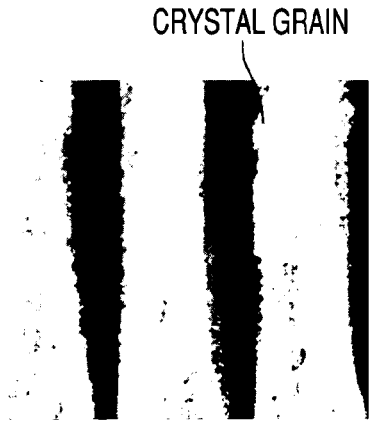
FIG. 15 is a cross section image, observed with a SEM, showing a state in which crystallized particles are left without being etched away when the crystallized particles exist in an amorphous dielectric medium.

FIG. 11 shows a process flow chart, and FIG. 12 is a schematic perspective view explaining the process flow shown in FIG. 11. In Sixth Embodiment, the thermal treatments are carried out by radiating a laser beams L having energies corresponding to the phase retardations $\Delta\Phi$ of the optical retardation plates within the dielectric substrate 1 onto the optical retardation plates within the dielectric substrate 1 to make temperatures locally rise, whereby each of the phase retardations in the whole area of the dielectric substrate 1 are corrected to the desired phase retardation $\Delta\Phi$.

Note that while in Sixth Embodiment, the laser beam L is used as locally heating means, any other method may be utilized. In addition, it needs scarcely to said that for the control for the heating, a method may be adopted in which not only the energy of the laser beam L is adjusted, but also a heat absorber is combined therewith as long as an amount of heating can be controlled in accordance with this method.

This application claims priority from Japanese Patent Application No. 2004-053252 filed Feb. 27, 2004, which is hereby incorporated by reference herein.

What is claimed is:

1. A method of manufacturing an optical retardation plate, comprising:

forming at least one kind of amorphous dielectric medium on a substrate;

etching the at least one kind of amorphous dielectric medium to form a grating pattern having a periodic structure with a period equal to or shorter than a predetermined wavelength;

crystallizing the etched amorphous dielectric medium through a thermal treatment to increase its refractive index and to increase a phase retardation of the grating pattern;

cutting said optical retardation plate into pieces;

measuring the optical retardation of the cut pieces; and subjecting those pieces whose optical retardation is below a predetermined value to thermal treatment to increase their optical retardation to the desired level.

* * * * *